(12) United States Patent
Kusumoto et al.

(10) Patent No.: US 11,322,737 B2
(45) Date of Patent: May 3, 2022

(54) ALKALINE DRY BATTERIES

(71) Applicant: Panasonic Intellectual Property Management Co., Ltd., Osaka (JP)

(72) Inventors: Yasuyuki Kusumoto, Hyogo (JP); Yasufumi Takahashi, Hyogo (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/979,398

(22) PCT Filed: Oct. 11, 2018

(86) PCT No.: PCT/JP2018/037887
§ 371 (c)(1),
(2) Date: Sep. 9, 2020

(87) PCT Pub. No.: WO2019/181029
PCT Pub. Date: Sep. 26, 2019

(65) Prior Publication Data
US 2021/0005886 A1   Jan. 7, 2021

(30) Foreign Application Priority Data
Mar. 23, 2018   (JP) .............................. JP2018-056994

(51) Int. Cl.
*H01M 4/24*   (2006.01)
*H01M 6/10*   (2006.01)
(Continued)

(52) U.S. Cl.
CPC ............. *H01M 4/244* (2013.01); *H01M 4/42* (2013.01); *H01M 6/10* (2013.01); *H01M 2004/027* (2013.01)

(58) Field of Classification Search
CPC .......... H01M 4/244; H01M 4/42; H01M 6/10; H01M 2004/027
See application file for complete search history.

(56) References Cited

U.S. PATENT DOCUMENTS

2002/0068222 A1   6/2002   Ishii et al.
2006/0115731 A1   6/2006   Oya et al.
(Continued)

FOREIGN PATENT DOCUMENTS

JP   H02195652 A   *   2/1990
JP   2002-110153 A       4/2002
(Continued)

OTHER PUBLICATIONS

WIPO machine generated English translation of JPH02195652A (Year: 1990).*

(Continued)

*Primary Examiner* — Christopher P Domone
*Assistant Examiner* — Kimberly Wyluda
(74) *Attorney, Agent, or Firm* — WHDA, LLP

(57) ABSTRACT

An alkaline dry battery includes a positive electrode, a negative electrode, a separator disposed between the positive electrode and the negative electrode, and an alkaline electrolytic solution contained in the positive electrode, the negative electrode and the separator. The negative electrode includes a negative electrode active material including zinc, and an additive. The additive includes at least one selected from the group consisting of maleic acid, maleic anhydride and maleate salts.

2 Claims, 1 Drawing Sheet

(51) Int. Cl.
    *H01M 4/42*    (2006.01)
    *H01M 4/02*    (2006.01)

(56) References Cited

U.S. PATENT DOCUMENTS

| | | | | |
|---|---|---|---|---|
| 2011/0189516 A1* | 8/2011 | Kato | ................ | H01M 4/38 |
| | | | | 429/94 |
| 2014/0302401 A1* | 10/2014 | Burkhardt | ............ | H01M 4/525 |
| | | | | 429/333 |
| 2015/0280239 A1* | 10/2015 | Hellring | ................ | H01M 4/623 |
| | | | | 429/332 |

FOREIGN PATENT DOCUMENTS

| | | | |
|---|---|---|---|
| JP | 2002-298862 | A | 10/2002 |
| JP | 2006-156158 | A | 6/2006 |
| JP | 2008117577 | A | 5/2008 |
| JP | 2011-216218 | A | 10/2011 |
| WO | 2010/140295 | A1 | 12/2010 |

OTHER PUBLICATIONS

International Search Report dated Dec. 11, 2018, issued in counterpart Application No. PCT/JP2018/037887. (1 page).

* cited by examiner

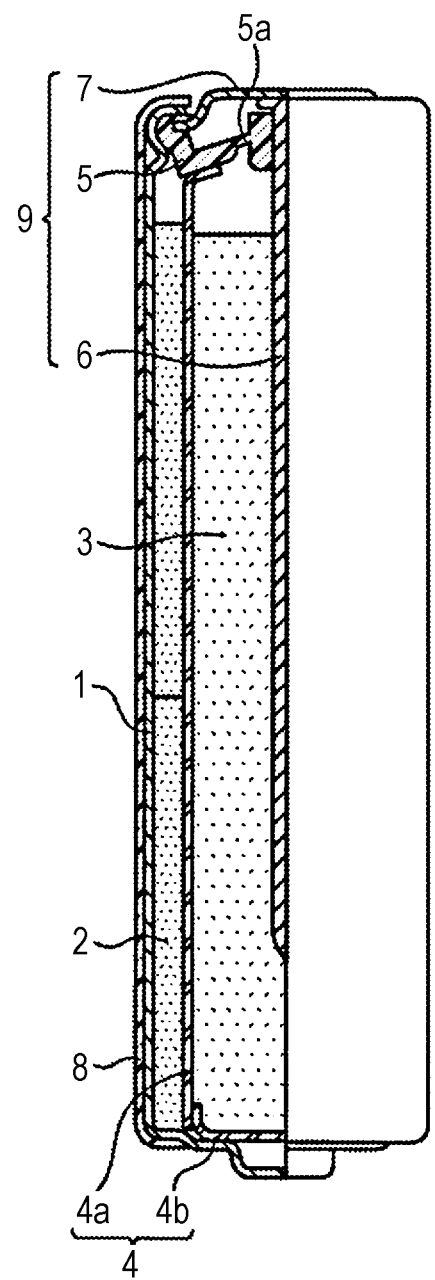

ALKALINE DRY BATTERIES

TECHNICAL FIELD

The present invention relates to an improvement of a negative electrode in an alkaline dry battery.

BACKGROUND ART

Alkaline dry batteries (alkaline manganese dry batteries) have a larger capacity and can draw a larger current than manganese dry batteries, and thus have found widespread use. An alkaline dry battery includes a positive electrode, a negative electrode, a separator disposed between the positive electrode and the negative electrode, and an alkaline electrolytic solution contained in the positive electrode, the negative electrode and the separator. The negative electrode contains a negative electrode active material including zinc.

When a plurality of alkaline dry batteries are used in a device by being connected in series, one of the alkaline dry batteries may be erroneously reversed and charged. In other cases, primary alkaline dry batteries may be accidentally charged on secondary battery chargers.

If an alkaline dry battery is charged by misuse, hydrogen is generated inside the battery to raise the internal pressure of the battery. When the internal pressure of the battery reaches a predetermined value as a result of the generation of a large amount of hydrogen, a safety valve is actuated to release hydrogen from the inside of the battery to the outside. During this process, an alkaline electrolytic solution may leak to the outside along with the release of hydrogen to the outside, and the alkaline electrolytic solution that has leaked may damage the device.

To prevent an alkaline electrolytic solution from leaking to the outside in the event of erroneous charging of an alkaline dry battery, Patent Literature 1 proposes to add zinc oxide to the alkaline electrolytic solution.

CITATION LIST

Patent Literature

PTL 1: Japanese Published Unexamined Patent Application No. 2006-156158

SUMMARY OF INVENTION

As erroneous charging of an alkaline dry battery continues, zinc deposition occurs in the negative electrode by the reduction of zinc ions in the electrolytic solution, resulting in a decrease in the amount of zinc ions in the electrolytic solution. With less zinc ions in the electrolytic solution, the resistance on the zinc deposition reaction increases significantly and the negative electrode potential lowers sharply, with the result that a hydrogen generation potential is reached early. As a result, hydrogen is generated in a large amount and a safety valve is actuated to release hydrogen to the outside together with the alkaline electrolytic solution leaking to the outside.

An aspect of the present disclosure resides in an alkaline dry battery which includes a positive electrode, a negative electrode, a separator disposed between the positive electrode and the negative electrode, and an alkaline electrolytic solution contained in the positive electrode, the negative electrode and the separator, wherein the negative electrode includes a negative electrode active material including zinc, and an additive, and the additive includes at least one selected from the group consisting of maleic acid, maleic anhydride and maleate salts.

The alkaline dry battery according to the present disclosure can prevent a leakage of the alkaline electrolytic solution to the outside of the battery even when charged erroneously.

BRIEF DESCRIPTION OF DRAWING

FIG. 1 is a partially sectional front view of an alkaline dry battery in an embodiment of the present invention.

DESCRIPTION OF EMBODIMENTS

An alkaline dry battery according to an embodiment of the present invention includes a positive electrode, a negative electrode, a separator disposed between the positive electrode and the negative electrode, and an alkaline electrolytic solution (hereinafter, simply written as the electrolytic solution) contained in the positive electrode, the negative electrode and the separator. The negative electrode includes a negative electrode active material including zinc, and an additive. The additive includes at least one selected from the group consisting of maleic acid, maleic anhydride and maleate salts.

If an alkaline dry battery is charged by misuse, a reaction occurs in the negative electrode in which zinc ions ($Zn^{2+}$) contained in the electrolytic solution are reduced and zinc deposits on the surface of the negative electrode active material. Consequently, the negative electrode potential is maintained around $-1.4$ V (vs. Hg/HgO) that is the reduction potential of zinc ions. If the charging of the alkaline dry battery continues further, zinc ions in the electrolytic solution decrease in number and the resistance on the above zinc deposition reaction increases, with the result that the negative electrode potential falls below $-1.7$ V (vs. Hg/HgO) that is the decomposition potential of water in the electrolytic solution (the hydrogen generation potential). The zinc ions in the electrolytic solution are present as zinc complex ions: $Zn(OH)_4^{2-}$.

When, in contrast, the additive described above is added to the negative electrode, the zinc deposition reaction is promoted even when the amount of zinc ions in the electrolytic solution is small, and the negative electrode potential can be retarded from reaching the hydrogen generation potential. Consequently, even if the alkaline dry battery is charged by misuse, the generation of hydrogen inside the battery and the leakage of the electrolytic solution to the outside of the battery are suppressed.

It is probable that when the negative electrode potential is lowered due to charging, the additive is reductively decomposed on the surface of the negative electrode active material to form a film (SEI: solid electrolyte interface) on the surface of the negative electrode active material. Although the mechanism by which the additive contained in the negative electrode promotes the zinc deposition reaction is unclear, the above film will be one of the factors that affect the zinc deposition reaction on the surface of the negative electrode active material.

The zinc ions contained in the electrolytic solution include, for example, part of zinc in the negative electrode active material which is dissolved in the electrolytic solution. The amount of zinc ions contained in the electrolytic solution may be increased by adding zinc oxide to the electrolytic solution. The concentration of zinc oxide in the electrolytic solution is, for example, 1 to 5 mass %.

The additive includes at least one selected from the group consisting of maleic acid, maleic anhydride and maleate salts. Maleic acid and salts thereof may be partially ionized and present as anions. Maleic anhydride may be partially present as maleic acid by being hydrolyzed with water in the electrolytic solution. Examples of the maleate salts include alkali metal salts, alkaline earth metal salts, onium salts and ammonium salts of maleic acid. Examples of the alkali metal salts include sodium salt and potassium salt. Examples of the alkaline earth metal salts include magnesium salt and calcium salt.

To suppress the generation of hydrogen during erroneous charging of the alkaline dry battery, the additive preferably includes maleic anhydride.

The amount of the additive contained in the negative electrode is preferably not less than 0.2 parts by mass and not more than 4 parts by mass per 100 parts by mass of the electrolytic solution contained in the negative electrode. When the amount of the additive contained in the negative electrode is 0.2 parts by mass or more per 100 parts by mass of the electrolytic solution contained in the negative electrode, the additive offers sufficient effects in suppressing the hydrogen generation. When the amount of the additive contained in the negative electrode is 4 parts by mass or less per 100 parts by mass of the electrolytic solution contained in the negative electrode, a sufficient packing density of the negative electrode active material is ensured. The amount of the additive contained in the negative electrode is more preferably not less than 1 part by mass and not more than 2 parts by mass per 100 parts by mass of the electrolytic solution contained in the negative electrode.

The positive electrode may contain the additive described above. Most of the additive added to the negative electrode remains in the negative electrode, but a very small proportion of the additive contained in the electrolytic solution in the negative electrode may migrate to the electrolytic solution in the positive electrode.

For purposes such as to control the viscosity, the negative electrode may further contain a surfactant or an aromatic compound. Examples of the surfactants include polyoxyalkylene group-containing compounds and phosphoric acid esters, with phosphoric acid esters and alkali metal salts thereof being preferable. A preferred aromatic compound is terephthalic acid.

Examples of the alkaline dry batteries according to an embodiment of the present invention include cylindrical batteries and coin batteries.

Hereinbelow, an alkaline dry battery according to an embodiment will be described in detail with reference to the drawing. The present invention is not limited to the embodiment described below. Further, the present invention may be modified appropriately without impairing the advantageous effects of the present invention. Furthermore, the embodiment described below may be combined with other embodiments.

FIG. 1 is a half sectional front view of an alkaline dry battery according to an embodiment of the present invention. FIG. 1 illustrates an example of cylindrical batteries having an inside-out structure. As illustrated in FIG. 1, the alkaline dry battery includes a hollow cylindrical positive electrode 2, a gelled negative electrode 3 disposed in the hollow portion of the positive electrode 2, a separator 4 arranged therebetween, and an electrolytic solution (not shown), and these are accommodated in a bottomed cylindrical battery case 1 that also serves as a positive electrode terminal. The electrolytic solution is an alkaline aqueous solution.

The positive electrode 2 arranged in contact with the inner wall of the battery case 1. The positive electrode 2 contains manganese dioxide and the electrolytic solution. The hollow portion of the positive electrode 2 is filled with the gelled negative electrode 3 via the separator 4. The negative electrode 3 contains a negative electrode active material including zinc, and the above additive, and usually further contains the electrolytic solution and a gelling agent.

The separator 4 has a bottomed cylindrical shape and contains the electrolytic solution. The separator 4 is composed of a cylindrical separator 4a and a bottom paper 4b. The separator 4a is arranged along the inner surface of the hollow portion of the positive electrode 2 and separates the positive electrode 2 and the negative electrode 3 from each other. Thus, the separator arranged between the positive electrode and the negative electrode means this cylindrical separator 4a. The bottom paper 4b is arranged at the bottom of the hollow portion of the positive electrode 2 and separates the negative electrode 3 and the battery case 1 from each other.

The opening of the battery case 1 is sealed with a sealing unit 9. The sealing unit 9 is composed of a gasket 3, a negative electrode terminal plate 7 also serving as a negative electrode terminal, and a negative electrode current collector 6. The negative electrode current collector 6 is inserted in the negative electrode 3. The negative electrode current collector 6 has a nail-like shape having a head and a body. The body of the negative electrode current collector 6 is inserted in a through hole provided in a central tubular portion of the gasket 5, and the head is welded to a central flat portion of the negative electrode terminal plate 7. The open end of the battery case 1 is crimped to a flange portion of the peripheral edge of the negative electrode terminal plate 7 via an outer peripheral end portion of the gasket 5. An exterior label 8 is attached to cover the exterior surface of the battery case 1.

The alkaline dry battery will be described in detail below.

(Negative Electrodes)

Examples of the negative electrode active materials include zinc and zinc alloys. From the point of view of corrosion resistance, the zinc alloy may include at least one selected from the group consisting of indium, bismuth and aluminum. The indium content in the zinc alloy is, for example, 0.01 to 0.1 mass %, and the bismuth content is, for example, 0.003 to 0.02 mass %. The aluminum content in the zinc alloy is, for example, 0.001 to 0.03 mass %. From the point of view of corrosion resistance, the proportion of elements other than zinc in the zinc alloy is preferably 0.025 to 0.08 mass %.

The negative electrode active material is usually used in the form of a powder. From the points of view of the packing density of the negative electrode and the diffusibility of the electrolytic solution within the negative electrode, the average particle size (D50) of the negative electrode active material powder is, for example, 100 to 200 μm, and preferably 110 to 160 μm. Incidentally, the average particle size (D50) in the present specification is the median diameter in a volume-based grain size distribution. The average particle size is determined using, for example, a laser diffraction/scattering particle size distribution analyzer.

For example, the negative electrode is obtained by mixing particles of the zinc-containing negative electrode active material, the additive described above, a gelling agent, and an electrolytic solution.

The gelling agent is not particularly limited and may be any known gelling agent used in the field of alkaline dry batteries. For example, a water-absorbing polymer or the like may be used. Examples of such gelling agents include polyacrylic acid and sodium polyacrylate.

The gelling agent is added in an amount of, for example, 0.5 to 2.5 parts by mass per 100 parts by mass of the negative electrode active material.

For purposes such as to control the viscosity, a surfactant or an aromatic compound may be added to the negative electrode. The surfactants and the aromatic compounds used here may be those described hereinabove. To ensure that the surfactant and the aromatic compound will be dispersed in the negative electrode more uniformly, it is preferable that the surfactant and the aromatic compound be added beforehand to the electrolytic solution used in the fabrication of the negative electrode.

A compound which contains a metal with a high hydrogen overvoltage such as indium or bismuth may be appropriately added to the negative electrode in order to enhance the corrosion resistance. To suppress the growth of dendrites such as zinc oxide, a small amount of a silicic acid compound such as a silicic acid or a potassium salt thereof may be appropriately added to the negative electrode.

(Negative Electrode Current Collectors)

Examples of the materials of the negative electrode current collector that is inserted in the gelled negative electrode include metals and alloys. The negative electrode current collector preferably includes copper, and may be made of, for example, an alloy containing copper and zinc such as brass. Where necessary, the negative electrode current collector may be plated with tin or the like.

(Positive Electrodes)

The positive electrode usually contains manganese dioxide as the positive electrode active material, and further a conductive agent and an electrolytic solution. Where necessary, the positive electrode may further contain a binder.

The manganese dioxide is preferably electrolytic manganese dioxide. Examples of the crystal structures of the manganese dioxide include α-type, β-type, γ-type, δ-type, ε-type, η-type, λ-type and ramsdellite type.

The manganese dioxide is used in a powder form. To easily ensure properties such as the packing density of the positive electrode and the diffusibility of the electrolytic solution within the positive electrode, the average particle size (D50) of the manganese dioxide is, for example, 25 to 60 μm.

From the points of view of formability and the suppression of positive electrode expansion, the BET specific surface area of the manganese dioxide may be in the range of, for example, 20 to 50 $m^2/g$. The BET specific surface area is determined by measuring and calculating the surface area using the BET equation that is a theoretical equation describing multilayer molecular adsorption. The BET specific surface area may be determined by, for example, a nitrogen adsorption method using a specific surface area measuring device.

Examples of the conductive agents include carbon blacks such as acetylene black, and other conductive carbon materials such as graphites. Some example graphites which may be used are natural graphites and artificial graphites. The conductive agent may be fibers or the like, and is preferably a powder. The average particle size (D50) of the conductive agent is, for example, 3 to 20 μm.

For example, the content of the conductive agent in the positive electrode is 3 to 10 parts by mass, and preferably 5 to 9 parts by mass per 100 parts by mass of the manganese dioxide.

Silver and silver compounds such as $Ag_2O$, $AgO$, $Ag_2O_3$ and $AgNiO_2$ may be added to the positive electrode to absorb hydrogen that is generated inside the alkaline dry battery during erroneous charging of the battery.

For example, the positive electrode is obtained by compacting into a pellet a positive electrode mixture including a positive electrode active material, a conductive agent, an alkaline electrolytic solution and optionally a binder. Alternatively, the positive electrode mixture may be formed into flakes or granules, classified as required, and compacted into a pellet.

The pellet, after placed into the battery case, may be secondarily pressed using a predetermined tool so as to be in close contact with the inner wall of the battery case.

(Separators)

Examples of the separator materials include celluloses and polyvinyl alcohols. The separator may be a nonwoven fabric mainly composed of fibers of the above material, or may be a microporous film such as of cellophane or polyolefin. A nonwoven fabric and a microporous film may be used in combination. Examples of the nonwoven fabrics include nonwoven fabrics made from a mixture based on cellulose fibers and polyvinyl alcohol fibers, and nonwoven fabrics made from a mixture based on rayon fibers and polyvinyl alcohol fibers.

In FIG. 1, the bottomed cylindrical separator 4 is composed of the cylindrical separator 4a and the bottom paper 4b. The bottomed cylindrical separator is not limited to this configuration, and a separator with a known shape used in the field of alkaline dry batteries may be used. The separator may be composed of a single sheet, or the separator may be composed of a plurality of thin sheets stacked on top of one another. The cylindrical separator may be formed by winding a thin sheet multiple times.

For example, the thickness of the separator is 200 to 300 μm. The separator preferably has the above thickness as a whole. If a sheet for forming the separator is thin, a plurality of the sheets may be stacked to attain the thickness described above.

(Electrolytic Solutions)

The electrolytic solution is contained in the positive electrode, the negative electrode and the separator. For example, the electrolytic solution is an alkaline aqueous solution containing potassium hydroxide. The concentration of potassium hydroxide in the electrolytic solution is preferably 30 to 50 mass %. The electrolytic solution may further contain zinc oxide. For example, the concentration of zinc oxide in the electrolytic solution is 1 to 5 mass %.

(Gaskets)

Examples of the materials of the gaskets include polyamide, polyethylene and polypropylene. For example, the gasket is obtained by injection molding the above material into a predetermined shape. From the point of view of facilitating the permeation of hydrogen, preferred gasket materials are 6,10-nylon, 6,12-nylon and polypropylene. The gasket usually has an explosion-proof thin portion. In order to increase the amount of hydrogen permeation, the thin portion is preferably annular. The gasket 5 in FIG. 1 has an annular thin portion 5a.

(Battery Cases)

For example, the battery case is a bottomed cylindrical metal case. The metal case is, for example, a nickel-plated steel sheet. To attain good adhesion between the positive electrode and the battery case, the battery case that is used is preferably a metal case in which the inner surface is covered with a carbon coating.

EXAMPLES

The present invention will be described in detail hereinbelow based on EXAMPLES and COMPARATIVE EXAMPLES. However, it should be construed that the scope of the present invention is not limited to the EXAMPLES described below.

Example 1

Cylindrical AA alkaline dry batteries (LR6) illustrated in FIG. 1 were produced in accordance with the following procedures (1) to (3).

(1) Fabrication of Positive Electrode

A graphite powder (average particle size (D50): 8 μm) as a conductive agent was added to an electrolytic manganese dioxide powder (average particle size (D50): 35 μm) as a positive electrode active material to give a mixture. The mass ratio of the electrolytic manganese dioxide powder to the graphite powder was 92.4:7.6. The electrolytic manganese dioxide powder used had a specific surface area of 41 $m^2/g$. An electrolytic solution was added to the mixture, and the resultant mixture was sufficiently stirred and compacted into flakes. A positive electrode mixture was thus obtained. The mass ratio of the mixture to the electrolytic solution was 100:1.5. The electrolytic solution used was an alkaline aqueous solution containing potassium hydroxide (concentration: 35 mass %) and zinc oxide (concentration: 2 mass %).

The flaky positive electrode mixture was crushed into granules, which were then classified through a 10-100 mesh sieve, and 11 g of the granules thus obtained were compacted into predetermined hollow cylindrical shapes having an outer diameter of 13.65 mm. Two positive electrode pellets were thus produced.

(2) Fabrication of Negative Electrode

A gelled negative electrode 3 was obtained by mixing a zinc alloy powder (average particle size (D50): 130 μm) as a negative electrode active material, maleic anhydride as an additive, an electrolytic solution, a gelling agent and terephthalic acid. The zinc alloy contained 0.02 mass % indium, 0.01 mass % bismuth and 0.005 mass % aluminum. The electrolytic solution used here was the same as the electrolytic solution used in the fabrication of the positive electrode. The gelling agent used was a mixture of crosslinked branched polyacrylic acid and highly crosslinked linear sodium polyacrylate. The amount of maleic anhydride added was 2 parts by mass per 100 parts by mass of the electrolytic solution. The mass ratio of the negative electrode active material to the electrolytic solution and the gelling agent was 100:50:1. The amount of terephthalic acid added was 0.15 parts by mass with respect to 99.85 parts by mass of the electrolytic solution.

(3) Assembling of Alkaline Dry Batteries

Varniphite manufactured by Nippon Kokuen Group was applied to the inner surface of a bottomed cylindrical battery case made of a nickel-plated steel sheet (outer diameter: 13.80 mm, wall thickness of cylindrical portion: 0.15 mm, height: 50.3 mm) to form a carbon coating having a thickness of about 10 μm. A battery case 1 was thus obtained. The two positive electrode pellets were vertically inserted into the battery case 1 and were then pressed to form a positive electrode 2 in close contact with the inner wall of the battery case 1. A bottomed cylindrical separator 4 was arranged inside the positive electrode 2, and thereafter an electrolytic solution was poured to impregnate the separator 4. The electrolytic solution used here was the same as the electrolytic solution used in the fabrication of the positive electrode. The unit was then allowed to stand for a predetermined time to let the electrolytic solution to permeate through the separator 4 into the positive electrode 2. Thereafter, the inside of the separator 4 was filled with 6 g of the gelled negative electrode 3.

The separator 4 was composed of a cylindrical separator 4a and a bottom paper 4b. The cylindrical separator 4a and the bottom paper 4b were nonwoven fabric sheets (basis weight: 28 $g/m^2$) made of a mixture based on rayon fibers and polyvinyl alcohol fibers in a mass ratio of 1:1. The nonwoven fabric sheet used as the bottom paper 4b had a thickness of 0.27 mm. The separator 4a had been formed by winding a 0.09 mm thick nonwoven fabric sheet three times.

A negative electrode current collector 6 was obtained by pressing general brass (Cu content: about 65 mass %, Zn content: about 35 mass %) into a nail shape, and plating the surface with tin. The diameter of the body of the negative electrode current collector 6 was 1.15 mm. The head of the negative electrode current collector 6 was electrically welded to a negative electrode terminal plate 7 made of a nickel-plated steel sheet. Thereafter, the body of the negative electrode current collector 6 was press-fitted into a central through hole in a gasket 5 mainly formed of polyamide 6,12. In this manner, a sealing unit 9 was produced which was composed of the gasket 5, the negative electrode terminal plate 7 and the negative electrode current collector 6.

Next, the sealing unit 9 was installed at the opening of the battery case 1. During this process, the body of the negative electrode current collector 6 was inserted into the negative electrode 3. The open end of the battery case 1 was crimped to the peripheral edge of the negative electrode terminal plate 7 via the gasket 5, thereby sealing the opening of the battery case 1. An exterior label 8 was applied to cover the exterior surface of the battery case 1. An alkaline dry battery A1 was thus fabricated.

[Evaluation]

The batteries A1 fabricated as described above were evaluated by the following test.

Four batteries A1 were provided. Three of the batteries were connected in series, and the remaining one was connected to the three batteries with its positive and negative terminals in the reversed direction. An assembled battery was thus fabricated. A resistance of 7.5Ω was connected to the assembled battery, and the assembled battery was allowed to stand for 15 minutes after the resistance was connected thereto, in other words, the reversely connected battery was charged for 15 minutes. Fifteen minutes after the resistance had been connected, the reversely connected battery was inspected for the presence or absence of any leakage of the electrolytic solution.

The above evaluation test was performed 20 times. Of the twenty reversely connected batteries, the number of batteries which had leaked the electrolytic solution was determined and the proportion thereof was calculated as the leak occurrence rate.

The above evaluation test simulates a case where a battery is erroneously connected with its positive and negative terminals in the reversed direction from other batteries in a medium load device. The charging time of 15 minutes assumes that the user who has put the batteries into the device will recognize an abnormal operation of the device and will notice the reversal of the battery and remove it in this period of time.

Example 2

Alkaline dry batteries A2 were fabricated and evaluated in the same manner as in EXAMPLE 1, except that maleic anhydride used as the additive in the production of the negative electrode was replaced by maleic acid.

Comparative Example 1

Alkaline dry batteries X1 were fabricated and evaluated in the same manner as in EXAMPLE 1, except that no additive was used in the production of the negative electrode.

The evaluation results are described in Table 1

TABLE 1

|  | Batteries No. | Additive | Leak occurrence rate (%) |
| --- | --- | --- | --- |
| Comp. Ex. 1 | X1 | None | 50 |
| Ex. 1 | A1 | Maleic anhydride | 0 |
| Ex. 2 | A2 | Maleic acid | 10 |

The batteries A1 and A2 of EXAMPLES 1 and 2 in which the negative electrode contained the additive attained a lower leak occurrence rate than the batteries X1 of COMPARATIVE EXAMPLE 1. In particular, the batteries A1 of EXAMPLE 1 which involved maleic anhydride as the additive achieved 0% leak occurrence rate.

Examples 3 to 6

Alkaline dry batteries A3 to A6 were fabricated and evaluated in the same manner as in EXAMPLE 1, except that in the production of the negative electrode, the amount of maleic anhydride added (per 100 parts by mass of the electrolytic solution used in the production of the negative electrode) was changed as described in Table 2.

The evaluation results are described in Table 2.

TABLE 2

|  | Batteries No. | Amount of maleic anhydride (parts by mass) | Leak occurrence rate (%) |
| --- | --- | --- | --- |
| Ex. 3 | A3 | 0.1 | 25 |
| Ex. 4 | A4 | 0.2 | 5 |
| Ex. 5 | A5 | 1 | 0 |
| Ex. 1 | A1 | 2 | 0 |
| Ex. 6 | A6 | 4 | 0 |

The batteries A3 to A6 of EXAMPLES 3 to 6 attained a lower leak occurrence rate than the batteries X1 of COMPARATIVE EXAMPLE 1. In particular, a leak occurrence rate of 5% or less was achieved by the batteries A1 and A4 to A6 of EXAMPLES 1 and 4 to 6 in which the amount of maleic anhydride contained in the negative electrode was 0.2 parts by mass to 4 parts by mass per 100 parts by mass of the electrolytic solution contained in the negative electrode.

INDUSTRIAL APPLICABILITY

The dry batteries according to an embodiment of the present invention may be used in all kinds of devices that are powered by dry batteries. For example, the dry batteries are suited for such devices as portable audio equipment, electronic games, lights and toys.

REFERENCE SIGNS LIST

1 BATTERY CASE
2 POSITIVE ELECTRODE
3 NEGATIVE ELECTRODE
4 BOTTOMED CYLINDRICAL SEPARATOR
4a CYLINDRICAL SEPARATOR
4b BOTTOM PAPER
5 GASKET
5a THIN PORTION
6 NEGATIVE ELECTRODE CURRENT COLLECTOR
7 NEGATIVE ELECTRODE TERMINAL PLATE
8 EXTERIOR LABEL
9 SEALING UNIT

The invention claimed is:

1. An alkaline dry battery comprising a positive electrode, a negative electrode, a separator disposed between the positive electrode and the negative electrode, and an alkaline electrolytic solution contained in the positive electrode, the negative electrode and the separator, wherein
the negative electrode comprises a negative electrode active material comprising zinc, and an additive,
the additive comprises maleic anhydride, and
wherein the amount of the additive contained in the negative electrode is not less than 0.2 parts by mass and not more than 4 parts by mass per 100 parts by mass of the electrolytic solution contained in the negative electrode.

2. The alkaline dry battery according to claim 1, wherein the positive electrode comprises the additive.

\* \* \* \* \*